UNITED STATES PATENT OFFICE.

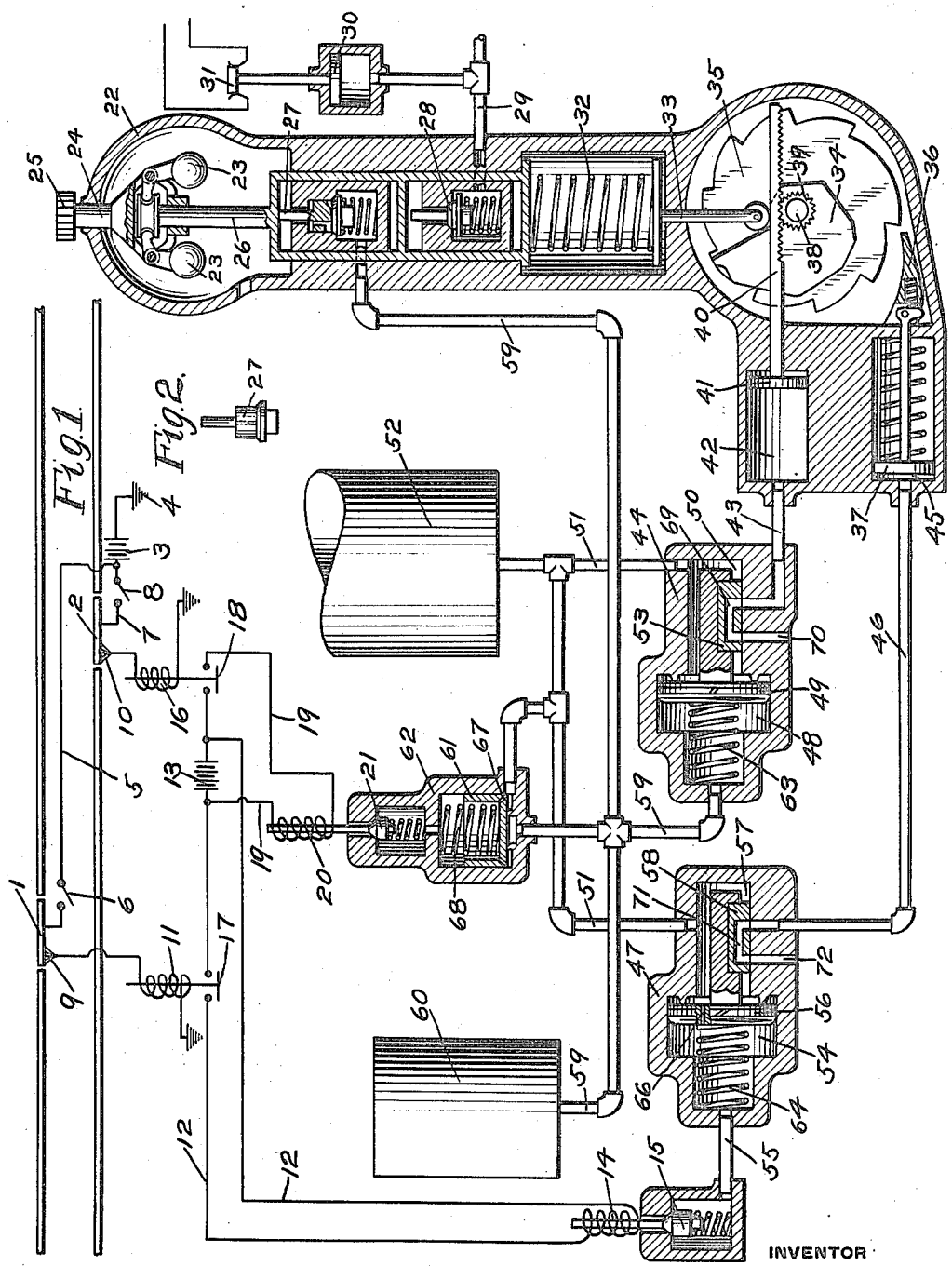

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMATIC TRAIN-SPEED-CONTROL DEVICE.

1,260,484.     Specification of Letters Patent.     Patented Mar. 26, 1918.

Application filed June 1, 1916. Serial No. 101,029.

*To all whom it may concern:*

Be it known that I, WALTER V. TURNER, a citizen of the United States, residing at Wilkinsburg, in the county of Allegheny and State of Pennsylvania, have invented new and useful Improvements in Automatic Train-Speed-Control Devices, of which the following is a specification.

This invention relates to speed controlling devices employed for automatically regulating the speed of trains.

In a prior patent application, Serial No. 64,230, filed November 30th, 1915, there is disclosed an automatic speed control system in which the maximum speed limit can be increased by steps, maintained at a given point, or can be reduced when necessary.

The reduction of the maximum speed limit is brought about through the energization of an electric circuit, so that if the circuit should be accidentally broken or if there should be a failure of current, the maximum speed limit could not be reduced and this might result in an accident.

The principal object of my present invention is to provide a speed control system of the above character, in which the deënergization of an electric circuit effects the reduction in the maximum speed limit.

Other objects and advantages will appear in the following more detailed description of the invention.

In the accompanying drawing; Figure 1 is a diagrammatic view of a train speed control system embodying my invention and Fig. 2 a detail view of the low speed vent valve.

As shown in the drawing, there is provided at intervals along the track and preferably in staggered relation, short insulated rail sections 1 and 2, which may form part of each main rail or may be separate sections arranged parallel with the main track.

A source of current 3 having one terminal grounded at 4 is connected by a wire 5, containing a switch 6 to each rail section 1 and by a wire 7 containing a switch 8 to each rail section 2.

On the locomotive or railway vehicle, there is provided contact brushes 9 and 10, adapted to respectively engage the rail sections, 1 and 2 as the train passes over the track.

A high speed relay 11 is connected to the brush 9 and controls a switch 17 in a circuit 12 containing a source of current 13 and a magnet coil 14 for controlling a vent valve 15.

A low speed relay 16 is connected to brush 10 and controls a switch 18 in a circuit 19 including the source of current 13 and a magnet coil 20 for controlling a vent valve 21.

A speed governor device is provided, comprising a casing 22 containing governor balls 23 carried by a rotatable member 24 provided with a pinion 25 geared to the car axle, so that the governor balls are rotated according to the speed of the car.

The centrifugal action of the governor balls operates a plunger 26, the movement of which is adapted to successively open valves 27 and 28.

The valve 28 is adapted to vent air from a pipe 29 for effecting an application of the brakes and the reduction in pressure in said pipe may also effect the movement of a piston 30 for opening a switch 31 in the power circuit of the vehicle.

The plunger 26 is subject to the pressure of a spring 32, the tension of which may be varied by the movement of a stem 33.

A cam 34 acts on the outer end of the stem 33 and rotates with a ratchet wheel 35 and a pawl 36 operated by a piston 37 is adapted to engage the teeth of the ratchet wheel.

On the shaft 38 carrying the cam and ratchet is secured a pinion 39 adapted to mesh with a rack bar 40 operated by a piston 41.

Piston chamber 42 containing piston 41 is connected by pipe 43 to a valve device 44 and piston chamber 45 containing piston 37 is connected by pipe 46 to a valve device 47.

The valve device 44 has a piston chamber 48 containing a piston 49 and a valve chamber 50 connected by pipe 51 to reservoir 52, which is preferably the main reservoir and containing a valve 53 adapted to be operated by piston 49.

The valve device 47 has a piston chamber 54 connected by pipe 55 to the valve chamber of valve 15 and containing a piston 56 and a valve chamber 57 connected to pipe 51 and containing valve 58 adapted to be operated by piston 56.

Piston chamber 48 is connected by a pipe 59 to a timing reservoir 60 and to the valve chamber of valve 27 and a branch from pipe 59 leads to the seated area of a valve piston 61 contained in casing 62 and controlled by vent valve 21.

In operation, the valve chambers 50 and 57 are charged with fluid under pressure from reservoir 52 and from valve chamber 57 fluid flows through a restricted port 66 in piston 56 to piston chamber 54, and the valve 15 being closed, fluid pressures equalize on opposite sides of piston 56, so that the same is maintained in normal release position by spring 64.

The fluid under pressure supplied to valve chamber 50 forces the piston 49 to its outer position, since there is no fluid pressure at this time in piston chamber 48 and the timing reservoir 60, and consequently, fluid is supplied from valve chamber 50 to piston chamber 42, forcing the low speed piston 41 to its outer position. Fluid under pressure also flows from reservoir 52 to valve piston 61 and through a restricted port 67 to the spring side of said valve piston, permitting the spring 68 to hold same seated, since the valve 21 is now closed.

With piston 41 out, the cam 34 is turned to the low speed position, in which spring 32 exerts its minimum pressure in opposition to the action of the governor balls 23. If the speed of the train exceeds the minimum speed limit, say ten miles per hour, the action of the governor balls will overcome the resistance of the spring 32 and the plunger 26 will operate the valve 28, so as to vent fluid from pipe 29 and effect an application of the brakes and also open the switch 31 to cut off current from the car motors.

When the train passes over the first contact sections along the track, if the conditions will permit an increase in the train speed, the switch 6 is closed, so that the relay 11 will be energized by the brush 9 contacting with section 1 and this effects the closure of switch 17 and circuit 12, thus energizing magnet 14 so as to effect the opening of valve 15.

Fluid is thereupon vented from piston chamber 54 and the piston 56 then operates valve 58 to uncover the port leading to pipe 46, so that fluid is supplied from valve chamber 57 and reservoir 52 to piston chamber 45. The piston 37 is then operated to effect the outward movement of pawl 36 and the partial rotation of ratchet wheel 35, thereby turning the cam 34 so as to lift the stem 33 and effect the compression of spring 32.

As the spring 32 acts in opposition to the centrifugal force of the governor balls, it will be evident that movement of the plunger 26 will require a greater train speed in order to provide force enough to throw the governor balls out.

Under the above conditions, the magnet 20 is also energized by the closing of switch 18, causing valve 21 to open and vent fluid from valve piston 61. This permits the fluid pressure acting below the valve piston to lift same and allow fluid under pressure to flow from the reservoir 52 to the timing reservoir 60 and to the piston chamber 48. Fluid pressures on opposite sides of piston 49 are thus equalized, permitting spring 63 to shift the piston 49 and valve 53 to release position, in which pipe 43 is connected through cavity 69 with exhaust port 70. It will thus be seen that since the piston 41 is now at atmospheric pressure, the same will offer no resistance to the movement of piston 37 to effect the rotation of the ratchet wheel 35.

Assuming that for every notch the ratchet wheel 35 is turned ahead by the pawl 36, the cam will move plunger 33 and compress the spring so that it will require an increase in speed of ten miles per hour for the action of the governor balls to overcome the resistance of the spring, then the first movement of the ratchet wheel one tooth as above described will increase the speed limit to twenty miles per hour. That is to say, the governor balls will not have sufficient force to overcome the resistance of spring 32 until the speed of the train exceeds twenty miles per hour.

However, at whatever speed the train is running, the action of the governor balls will be sufficient to move the plunger 26 to some extent against the resistance of the spring 32, so that the valve 27 will be opened more or less to permit the venting of fluid from the timing reservoir 60, and the greater the speed, the wider the valve 27 is opened, and the more rapidly the pressure in timing reservoir 60 is reduced.

If on passing the next contact sections, the contact section 2 should not be energized, then the pressure in timing reservoir will continue to reduce by venting of fluid at the valve 27 and since the volume of this reservoir is preferably such that the pressure will be reduced between succeeding contact sections sufficiently to effect the operation of piston 49, if the pressure therein is not replenished, and it will thus be seen that if the contact section 2 is deënergized, the piston 49 will be operated substantially on passing the section, so as to operate the valve 53 and effect the admission of fluid to piston 41, so that the cam 34 will be thrown back to the minimum speed position.

If, however, the succeeding contact section 2 is energized, then the switch 18 will be closed and the magnet 20 energized to open valve 21 so that valve piston 61 is operated to open communication for supplying fluid to the timing reservoir and to the piston 49, thus permitting the piston 41 to remain in its adjusted position, wherever it happens to be, due to the rotation of ratchet wheel 35 by pawl 36.

The operation of the speed control apparatus may be summarized as follows: When both the high and the low speed contact sections are energized, the speed limit is raised one step higher as successive contact sections are passed over. If the train passes over a low speed contact section which is deënergized, either intentionally, or by failure of current, or breakage of circuit, then the speed limit is at once reduced to the minimum. If the low speed contact section is energized and the high speed contact deënergized, the speed limit will remain the same, being neither increased nor diminished.

In effect, the operation of the low speed portion of the apparatus is based on distance traveled, since the rate of reduction in pressure in the timing reservoir varies with the speed of the train, so that at a high train speed, while the distance between contact sections is covered in a shorter time, the valve 27 will be opened wider, so that the pressure in the timing reservoir reduces at a more rapid rate. On the other hand, if the speed of the train is low, then the valve 27 will only open slightly, and the pressure in reservoir 60 will reduce more slowly, so that whatever the speed of the train, the pressure in the timing reservoir will be reduced to the point for operating the low speed piston 49 only when the predetermined distance between contact sections has been passed over.

Having now described my invention, what I claim as new and desire to secure by Letters Patent, is:

1. In a train speed control apparatus, the combination with a mechanism for effecting an increase and a decrease in the speed limit of the train of high and low speed contact sections located along the track and electrically controlled means on the train operated upon passing an energized high speed contact section for effecting the operation of said mechanism to increase the maximum speed limit of the train and operated upon passing a deënergized low speed contact section for effecting the operation of said mechanism to reduce the maximum speed limit of the train.

2. In a train speed control apparatus, the combination with a device governed by the speed of the train for limiting the speed thereof, of a valve device operated upon a predetermined reduction in fluid pressure for effecting the adjustment of said device to reduce the operating speed limit of said device, normally energized contacts located along the track, and an electrically controlled means on the train operated upon passing an energized contact for supplying fluid to said valve device to prevent the operation thereof.

3. In a train speed control apparatus, the combination with a mechanism for limiting the speed of the train and adapted to be adjusted to operate at different speed limits, of a valve device operated upon a predetermined reduction in fluid pressure for effecting the adjustment of said mechanism, means for reducing the fluid pressure on said device according to the speed of the train, normally energized contacts along the track, and electrically controlled means operated upon passing an energized contact to supply fluid to said valve device.

4. In a train speed control apparatus, the combination with a valve device for effecting a reduction in the train speed limit, of a train speed controlled means for venting fluid from said valve device to effect the operation thereof, normally energized contacts located along the track, and electrically controlled means operated upon passing an energized contact for supplying fluid to said valve device to prevent the operation thereof.

5. In a train speed control apparatus, the combination with a train speed controlled mechanism for effecting a reduction in train speed when the speed exceeds a predetermined limit, a valve device for effecting the adjustment of said mechanism to a higher speed limit, and a valve device subject to the pressure of a timing reservoir and operated upon a predetermined reduction in pressure in the timing reservoir for effecting the adjustment of said mechanism to a minimum speed limit, of normally energized contacts located along the track, electrically controlled means operated upon passing an energized contact to supply fluid to said timing reservoir, and means for venting fluid from said timing reservoir according to the speed of the train.

6. In a train speed control apparatus, the combination with a train speed controlled mechanism, electrically controlled means for adjusting said mechanism to operate at a higher speed limit, and electrically controlled means for adjusting said mechanism to operate at a minimum speed limit, of contacts located along the track, the energization of which is adapted to effect the operation of the high speed electrically controlled means, and other contacts adapted upon deënergization to effect the operation of the minimum speed electrically controlled means.

7. In a train speed control apparatus, the combination with a mechanism adapted to be adjusted to operate at different speed limits for reducing the speed of the train when the speed exceeds the limit for which said mechanism is adjusted, of a valve device subject to the pressure of a timing reservoir for effecting the adjustment of said mechanism upon a predetermined reduction in pressure in said reservoir and valve means for venting fluid from said reservoir at a rate corresponding with the speed of the train and the adjustment of said mechanism.

In testimony whereof I have hereunto set my hand.

WALTER V. TURNER.